(12) United States Patent
Nikolic et al.

(10) Patent No.: US 7,326,754 B2
(45) Date of Patent: Feb. 5, 2008

(54) THERMOSET ADHESIVE FILMS

(76) Inventors: Nikola A. Nikolic, 221 Washington Rd., Princeton, NJ (US) 08540; Ruzhi Zhang, 1 John F. Kennedy Blvd., Apt. 42D, Somerset, NJ (US) 08873; Osama M. Musa, 24 Meadowbrook Dr., Hillsborough, NJ (US) 08844; Hwail Jin, 7952 Carolyn Cir., La Palma, CA (US) 90623; Bing Wu, 4555 Alla Rd., #2, Marina Del Rey, CA (US) 90292; David Shenfield, 18444 Santa Yolanda Cir., Fountain Valley, CA (US) 92708

( * ) Notice: Subject to any disclaimer, the term of this patent is extended or adjusted under 35 U.S.C. 154(b) by 253 days.

(21) Appl. No.: 11/248,490

(22) Filed: Oct. 12, 2005

(65) Prior Publication Data

US 2006/0030672 A1    Feb. 9, 2006

Related U.S. Application Data

(60) Division of application No. 11/044,374, filed on Jan. 27, 2005, now abandoned, which is a continuation-in-part of application No. 10/146,387, filed on May 14, 2002, now abandoned.

(51) Int. Cl.
| | |
|---|---|
| C08F 136/56 | (2006.01) |
| C08F 136/02 | (2006.01) |
| C08F 236/56 | (2006.01) |
| C08F 236/10 | (2006.01) |

(52) U.S. Cl. ............. 525/330.9; 525/326.1; 525/331.9; 525/282

(58) Field of Classification Search ......... 525/330.9, 525/326.1, 331.9, 282
See application file for complete search history.

(56) References Cited

FOREIGN PATENT DOCUMENTS

EP         1156034      * 11/2001

* cited by examiner

*Primary Examiner*—Duc Truong
(74) *Attorney, Agent, or Firm*—Jane E. Gennaro

(57) ABSTRACT

This invention is a film adhesive prepared from an adhesive composition comprising a polymer system, a film forming rubber compound, and curing agents for the polymeric system. The polymer system comprises a base polymer and electron donor and electron acceptor functionality.

3 Claims, No Drawings

THERMOSET ADHESIVE FILMS

This application is a divisional of application Ser. No. 11/044,374, filed 27 Jan. 2005 now abandoned, which is a continuation-in-part of Ser. No. 10/146,387 filed 14 May 2002 now abandoned.

FIELD OF THE INVENTION

This invention relates to film adhesives, and particularly film adhesives for use in semiconductor packaging.

BACKGROUND OF THE INVENTION

A common mode of electronics packaging involves affixing semiconductor devices onto substrates by means of an adhesive tape. Epoxy compounds and resins currently are among the most commonly used materials for current film based adhesive applications, such as die attach, in which a semiconductor die is attached to a substrate. In a typical embodiment, a film-forming rubber polymer is blended with epoxy resins and a hardening agent. These compositions can then be cured upon application of heat, which results in the development of a thermoset network. One drawback to epoxy adhesives is their ultimate latency. Typically, these materials must be stored at low temperature to avoid premature advancement of the adhesive. Moreover, the speed of cure for these compositions is relatively slow making the die-attach operation the least efficient step in the total assembly manufacturing process for wirebonded integrated circuit packages. This creates a need for a film adhesive that can be rapidly cured compared to the conventional thermoset film adhesives, and particularly to films containing no epoxy.

SUMMARY OF THE INVENTION

This invention is a film adhesive prepared from an adhesive composition comprising a polymer system, a film forming rubber compound, and curing agents for the polymeric system. In a preferred embodiment the polymer system contains no epoxy functionality. The polymer system comprises a base polymer and electron donor and electron acceptor functionality. The electron donor and electron acceptor functionality can be pendant from the base polymer, or can be interdispersed with the base polymer as independent compounds. In some cases, the base polymer can function as a film-forming rubber compound. The film can be prepared directly as a monolayer from the adhesive composition, or from coating the adhesive composition onto both sides of a thermal resistant tape substrate.

DETAILED DESCRIPTION OF THE INVENTION

The polymer system for preparing the film adhesives will contain a base polymer (hereinafter "polymer" or "base polymer") and electron donor and electron acceptor functionality. The system can be segregated into several classes: (1) an unsubstituted base polymer blended with an independent electron donor compound and an independent electron acceptor compound; (2) a base polymer substituted with pendant electron acceptor functionality, blended with an independent electron donor compound, and optionally an independent electron acceptor compound; (3) a base polymer substituted with pendant electron donor functionality, blended with an independent electron acceptor compound and optionally an independent electron donor compound; (4) a base polymer substituted with pendant electron donor and electron acceptor functionality, or a combination of a base polymer substituted with pendant electron donor functionality and a base polymer substituted with pendant electron acceptor functionality, optionally blended with an independent electron donor compound, or an independent electron acceptor compound, or both. Preferably, there will be a 1:1 molar ratio of electron donor to electron acceptor; however, the molar ratio can range from 0.01-1.0:1.0-0.01.

A suitable base polymer in the polymer system of the inventive film adhesive is prepared from acrylic and/or vinyl monomers using standard polymerization techniques. The acrylic monomers that may be used to form the base polymer include $\alpha,\beta$-unsaturated mono and dicarboxylic acids having three to five carbon atoms and acrylate ester monomers (alkyl esters of acrylic and methacrylic acid in which the alkyl groups contain one to fourteen carbon atoms). Examples are methyl acryate, methyl methacrylate, n-octyl acrylate, n-nonyl methacrylate, and their corresponding branched isomers, such as, 2-ethylhexyl acrylate. The vinyl monomers that may be used to form the base polymer include vinyl esters, vinyl ethers, vinyl halides, vinylidene halides, and nitriles of ethylenically unsaturated hydrocarbons. Examples are vinyl acetate, acrylamide, 1-octyl acrylamide, acrylic acid, vinyl ethyl ether, vinyl chloride, vinylidene chloride, acrylonitrile, maleic anhydride, and styrene.

Another suitable base polymer in the polymer system of the inventive film adhesive is prepared from conjugated diene and/or vinyl monomers using standard polymerization techniques. The conjugated diene monomers that may be used to form the polymer base include butadiene-1,3,2-chlorobutadiene-1,3, isoprene, piperylene and conjugated hexadienes. The vinyl monomers that may be used to form the base polymer include styrene, $\alpha$-methylstyrene, divinylbenzene, vinyl chloride, vinyl acetate, vinylidene chloride, methyl methacrylate, ethyl acrylate, vinylpyridine, acrylonitrile, methacrylonitrile, methacrylic acid, itaconic acid and acrylic acid.

Alternatively, the base polymer can be purchased commercially. Suitable commercially available polymers include acrylonitrile-butadiene rubbers from Zeon Chemicals and styrene-acrylic copolymers from Johnson Polymer.

In those systems in which the base polymer is substituted with electron donor and/or electron acceptor functionality, the degree of substitution can be varied to suit the specific requirements for cross-link density in the final applications. Suitable substitution levels range from 6 to 500, preferably from 10 to 200.

The base polymer, whether substituted or unsubstituted will have a molecular weight range of 2,000 to 1,000,000. The glass transition temperature (Tg) will vary depending on the specific base polymer. For example, the Tg for butadiene polymers ranges from $-100°$ C. to $25°$ C., and for modified acrylic polymers, from $15°$ C. to $50°$ C.

Suitable electron donor functionality includes vinyl ether groups and carbon to carbon double bonds external to an aromatic ring and conjugated with the unsaturation in the aromatic ring. Suitable electron acceptor groups include maleimides, acrylates, fumarates and maleates.

Examples of suitable starting materials for reacting with complementary functionality on the base polymer in order to add the electron donor or electron acceptor functionality pendant to the base polymer include: for electron donor functionality, hydroxybutyl vinyl ether, cinnamyl alcohol, 1,4-cyclohexane-dimethanol monovinyl ether, 3-isopropenyl-α,α-dimethylbenzyl isocyanate, isoeugenol, and the derivatives of the aforementioned compounds; for electron acceptor functionality, dioctyl maleate, dibutyl maleate, dioctyl fumarate, dibutyl fumarate, N-(6-hydroxyhexyl) maleimide, 6-maleimidocaproic acid, and 3-maleimidopropionic acid.

Independent electron donor compounds for blending with the base polymer include compounds having at least two vinyl ether groups, or having at least two carbon to carbon double bonds external to aromatic rings and conjugated with the unsaturation in the aromatic ring. Suitable divinyl ether examples include compounds such as bis[4-(vinyloxy)butyl] tere-phthalate, bis[4-(vinyloxy)butyl](4-methyl-1,3-phenylene)biscarbamate, bis[4-(vinyloxy) butyl]1,6-hexanediylbiscarbamate, 4-(vinyloxy)butyl stearate, and bis[4 (vinyloxy)butyl](methylenedi-4,1-phenylene)biscarbamate (sold under the trade name Vectomer from Morflex, Inc). Exemplary compounds having at least two carbon to carbon double bonds external to aromatic rings and conjugated with the unsaturation in the aromatic ring include:

the adduct of tricyclodecane-dimethanol and 3-isopropenyl-α,α-dimethylbenzyl isocyanate (m-TMI) having the structure

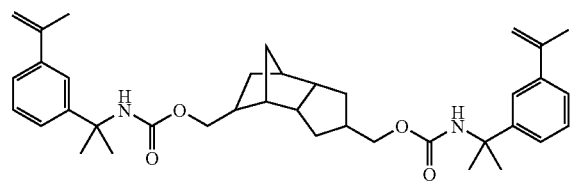

the adduct of 2-hydroxyethyl disulfide and m-TMI having the structure

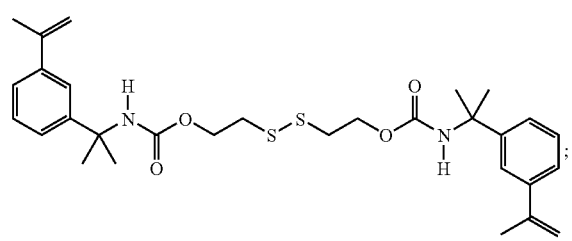

the adduct of cyanurate/trifunctional isocyanate and cinnamyl alcohol having the structure

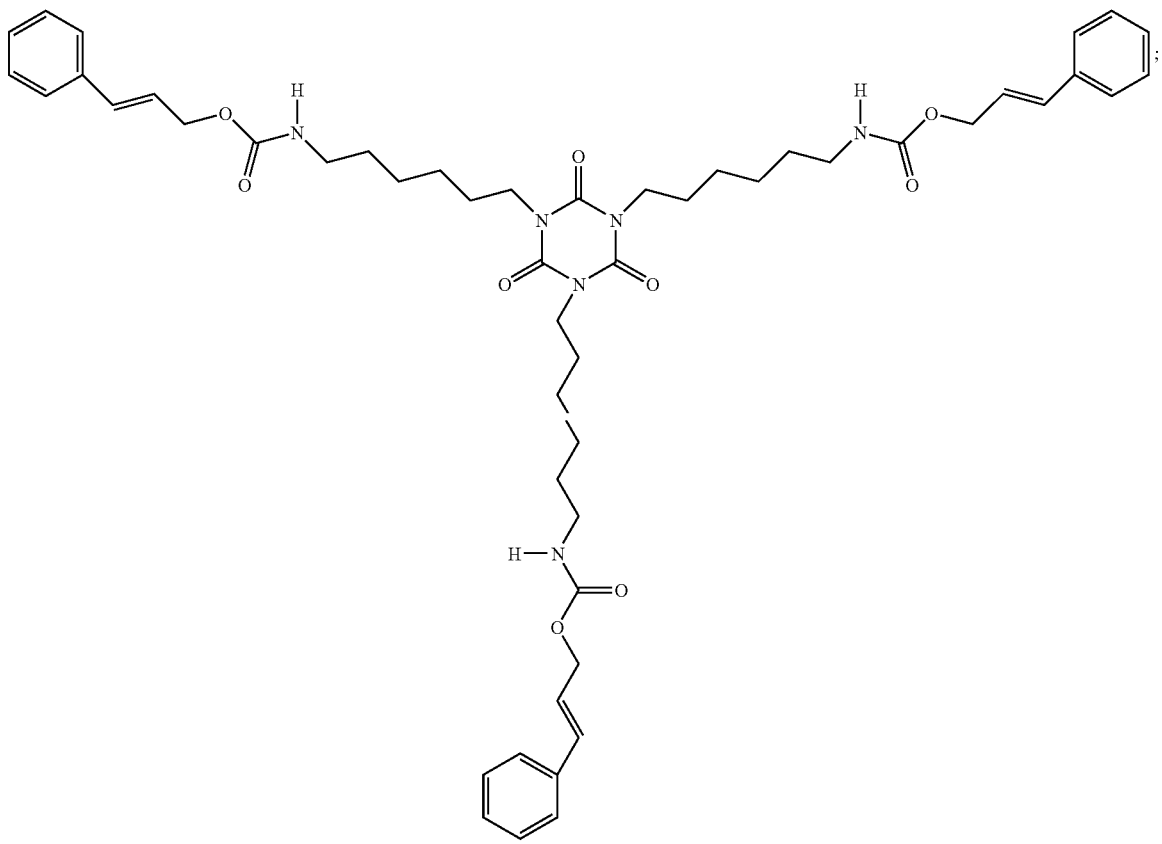

the adduct of 1,3-propanediol and m-TMI having the structure

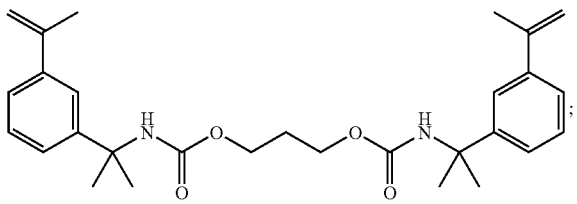

the adduct of 1,4-butanediol and m-TMI having the structure

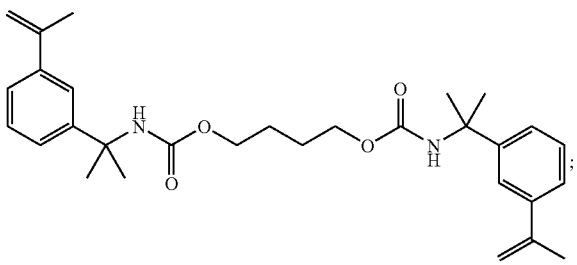

and the adduct of cinnamyl alcohol and 1,6-diisocyanatohexane having the structure

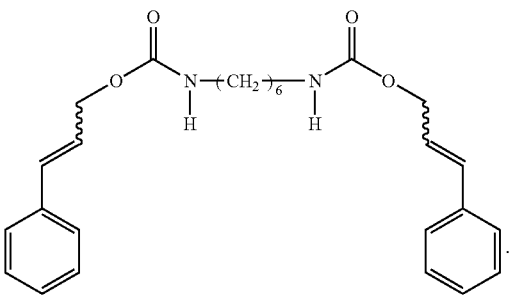

These compounds can be prepared by standard synthetic methods known to those skilled in the art without undue experimentation.

Independent electron acceptor compounds for blending with the base polymer include resins having at least two intramolecular maleimide, acrylate, fumarate or maleate groups. Examples of bismaleimides include: N,N'-ethylene-bis-maleimide, N,N'-butylene-bis-maleimide, N,N'-phenylene-bis-maleimide, N,N'-hexamethylene-bis-maleimide, N,N'-4,4'-diphenyl methane-bis-maleimide, N,N'-4,4'-diphenyl ether-bis-maleimide, N,N'-4,4'-diphenyl sulfone-bis-maleimide, N,N'-4,4'-dicyclohexyl methane-bis-maleimide, N,N'-xylylene-bis-maleimide, N,N'-diphenyl cyclohexane-bis-maleimide and the like.

Suitable film forming resins or compounds include acrylic polymers (sold under the trade name TEISAN RESIN from Nagase ChemteX Corporation) and acrylonitrile-butadiene elastomers (sold under the trade name NIPOL from Zeon Chemicals). These materials, in general, will be present in the adhesive composition from which the film will be prepared, in an amount ranging from 10% to 70%, preferably 15% to 50%, by weight of the adhesive formulation.

Other levels may be suitable depending on the end use application, and optimal levels can be determined without undue experimentation on the part of the formulator.

Suitable curing agents for the polymer system are thermal initiators and photoinitiators, present in an amount of 0.1% to 10%, preferably 0.1% to 5.0%, by weight of the polymer system. Preferred thermal initiators include peroxides, such as butyl peroctoates and dicumyl peroxide, and azo compounds, such as 2,2'-azobis(2-methyl-propanenitrile) and 2,2'-azobis(2-methyl-butanenitrile). A preferred series of photoinitiators is one sold under the trademark Irgacure by Ciba Specialty Chemicals. In some formulations, both thermal initiation and photoinitiation may be desirable; for example, the curing process can be started by irradiation, and in a later processing step curing can be completed by the application of heat to accomplish the thermal cure. In general, these compositions will cure within a temperature range of 70° C. to 250° C., and curing will be effected at a temperature within the range of ten seconds to three hours. The time and temperature curing profile of each formulation will vary with the specific electron donor compound and the other components of the formulation, but the parameters of a curing profile can be determined by a practitioner skilled in the art without undue experimentation.

In some cases, it may be an advantage to add an epoxy compound or resin to the adhesive composition. Suitable epoxy compounds or resins include bifunctional and polyfunctional epoxy resins such as bisphenol A-type epoxy, cresol novolak epoxy, or phenol novolak epoxy. Another suitable epoxy resin is a multifunctional epoxy resin from Dainippon Ink and Chemicals, Inc. (sold under the product number HP-7200). When added to the formulation, the epoxy will be present in an amount up to 80% by weight.

If an epoxy compound is added, the formulation will need to contain a curing or hardening agent for the epoxy. Suitable curing agents include amines, polyamides, acid anhydrides, polysulfides, trifluoroboron, and bisphenol A, bisphenol F and bisphenol S, which are compounds having at least two phenolic hydroxyl groups in one molecule. A curing accelerator may also be used in combination with the curing agent. Suitable curing accelerators include imidazoles, such as 2-methylimidazole, 2-ethyl-4-methylimidazole, 4-methyl-2-phenylimidazole, and 1-cyanoethyl-2-phenylimidazolium trimellitate. The curing agents and accelerators are used in standard amounts known to those skilled in the art.

Other materials, such as adhesion promoters (epoxides, silanes), dyes, pigments, and rheology modifiers, may be added as desired for modification of final properties. Such materials and the amounts needed are within the expertise of those skilled in the art.

Filler particles that enhance the mechanical, electrical conductivity, or thermal conductivity may also be added. Suitable conductive fillers are carbon black, graphite, gold, silver, copper, platinum, palladium, nickel, aluminum, silicon carbide, boron nitride, diamond, and alumina. Suitable nonconductive fillers are particles of vermiculite, mica, wollastonite, calcium carbonate, titania, sand, glass, fused silica, fumed silica, barium sulfate, and halogenated ethylene polymers, such as tetrafluoroethylene, trifluoroethylene, vinylidene fluoride, vinyl fluoride, vinylidene chloride, and vinyl chloride. When present, fillers will be in amounts of 0.1% to 90%, preferably from 5% to 90%, by weight of the formulation.

POLYMER SYNTHETIC EXAMPLES

Example 1

This example discloses a butadiene/acrylo-nitrile base polymer containing pendant acrylate (electron acceptor) functionality.

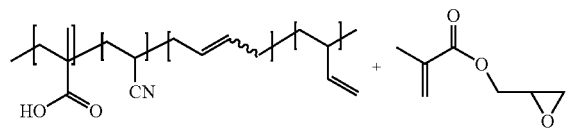

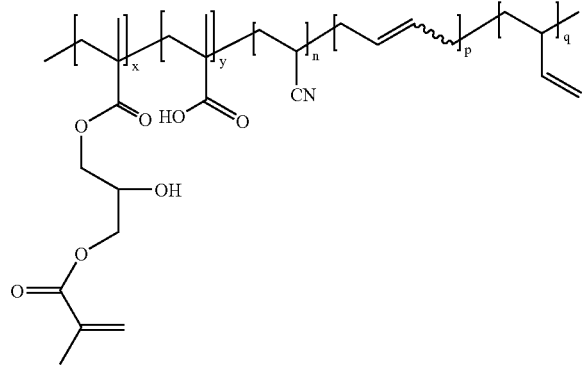

where x=50, y=5, n=310, p=678, and q=59, based on GPC and NMR analysis (one skilled in the art will recognize that these values may vary slightly due to the polymeric character of the material).

Carboxylated butadiene/acrylonitrile polymer (50.6 g) (Nipol 1072 from Zeon Chemicals) was solvated in 4-methyl-2-pentanone (MIBK, 250 mL) in a 500 mL four-necked flask equipped with a mechanical stirrer, condenser and drying tube. Glycidyl methacrylate (9.78 g) and tetrabutylphosphonium acetate solution (0.58 g) (TBPAAC, catalyst, 70% by weight of tetrabutylphosphonium acid acetate in methanol from Morton International, Inc.) were added to the mixture with stirring. The mixture was heated to 110° C. and held at that temperature for approximately twelve hours. The final product has a viscosity of 4870 mPa.s at ambient temperature and according to titration results of the residual carboxylic acid of the modified Nipol rubber, the carboxyl conversion is about 90%. According to GPC analysis, the weight average molecular weight and the number average molecular weight of the modified Nipol polymer are 430,500 g/mol and 60,900 g/mol, respectively.

Example 2

This example discloses a butadiene/acrylonitrile base polymer with pendant styrenic (electron donor) functionality,

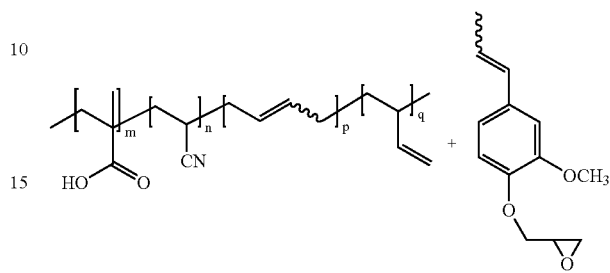

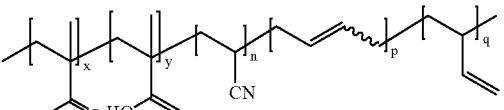

where x=56, y=16, n=401, p=877, and q=76 based on GPC and NMR analysis (one skilled in the art will recognize that these values may vary slightly due to the polymeric character of the material).

Carboxylated butadiene/acrylonitrile polymer (38.0 g) (Nipol 1072 from Zeon Chemicals) was solvated in 4-methyl-2-pentanone (MIBK, 255 mL) in a 500 mL four-necked flask equipped with a mechanical stirrer, condenser and drying tube. Isoeugenol glycidyl ether (11.43 g) and tetrabutyl-phosphonium acetate solution (0.62 g) (TBPAAC, catalyst, 70% by wetight of tetrabutylphosphonium acid acetate in methanol from Morton International, Inc.) were added into the mixture with stirring. The mixture was heated to 110° C. and held at that temperature for approximately fourteen hours. According to titration results of the residual carboxylic acid of the modified Nipol rubber, the carboxyl conversion is about 87%. The product was purified by precipitation in methanol three times. According to GPC analysis, the weight average molecular weight and the number average molecular weight of the modified Nipol polymer are 554,400 g/mol and 89,100 g/mol, respectively.

Example 3

This example discloses a butadiene/acrylonitrile base polymer with pendant styrenic (electron donor) functionality,

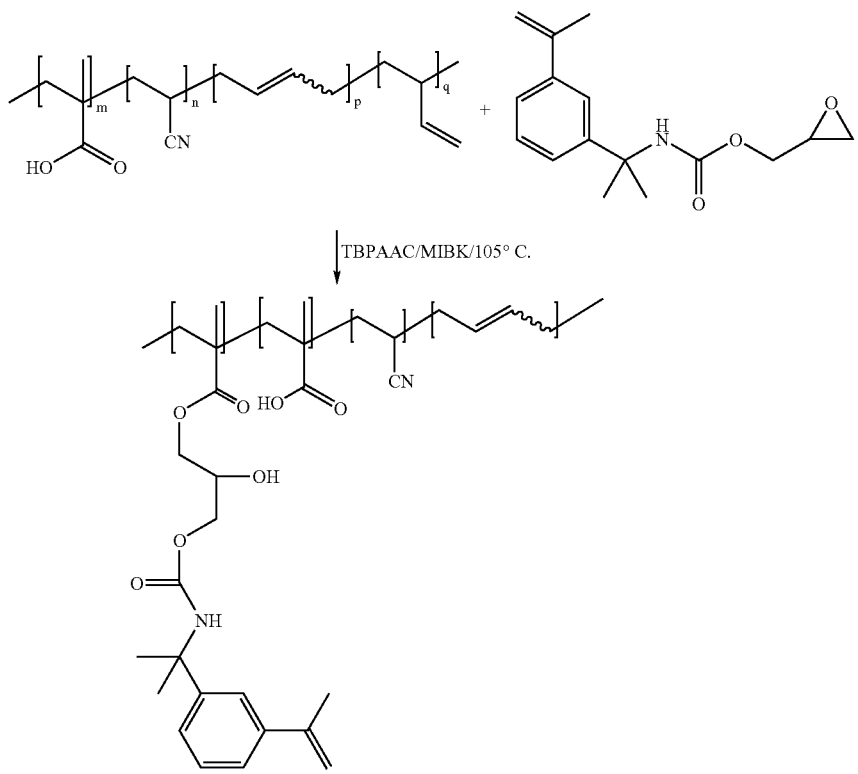

where x=49, y=7, n=310, p=739, and q=59 based on GPC and NMR analysis (one skilled in the art will recognize that these values may vary slightly due to the polymeric character of the material).

Carboxylated butadiene/acrylonitrile polymer (53.8 g) (Nipol 1072 from Zeon Chemicals) was solvated in 4-methyl-2-pentanone (MIBK, 360 mL) in a 1 L four-necked flask equipped with a mechanical stirrer, condenser and drying tube. Glycidyl N-(3-isopropenyl-α,α-dimethylbenzyl) carbamate (14.8 g) and tetrabutylphosphonium acetate solution (0.54 g) (TBPAAC, catalyst) were added into the mixture with stirring. The mixture was heated to 105° C. and held at that temperature for approximately fifteen hours. The final product has a viscosity of 2000 mPa.s at ambient temperature and according to titration results, the carboxyl conversion is about 88%. According to GPC analysis, the weight average molecular weight and the number average molecular weight of the modified Nipol polymer are 666,000 g/mol and 75,600 g/mol, respectively.

Example 4

This example discloses a butadiene/acrylonitrile base polymer with pendant cinnamyl (electron donor) functionality,

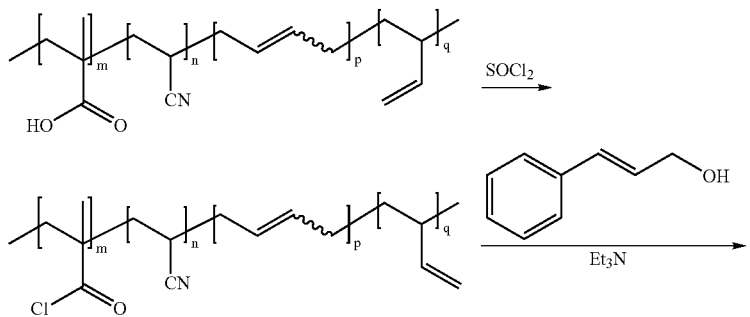

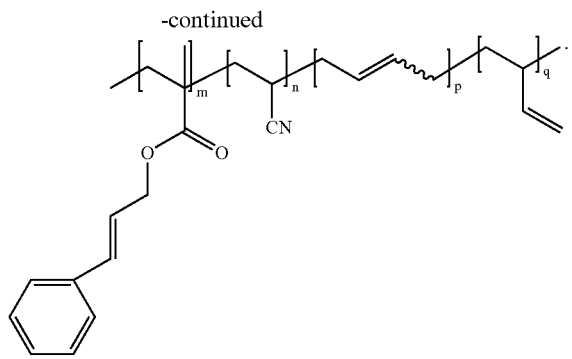

A solution of carboxylated butadiene/acrylonitrile polymer (one molar equivalent based on the carboxylic acid) in toluene is reacted with excess thionyl chloride at 50° C. for approximately fourteen hours. The excess thionyl chloride and the solvent are removed under reduced pressure to afford the butadiene/acrylonitrile polymer with pendant acid chloride.

One molar equivalent of cinnamyl alcohol and one molar equivalent of triethylamine are mixed in dry toluene at 0° C., to which is added the butadiene/acrylonitrile polymer with pendant acid chloride dissolved in dry toluene (one molar equivalent based on the acid chloride). The mixture is allowed to react overnight. The product is purified by precipitation in methanol three times.
M

Example 5

This example discloses a butadiene/acrylonitrile base polymer with pendant cinnamyl (electron donor) functionality,

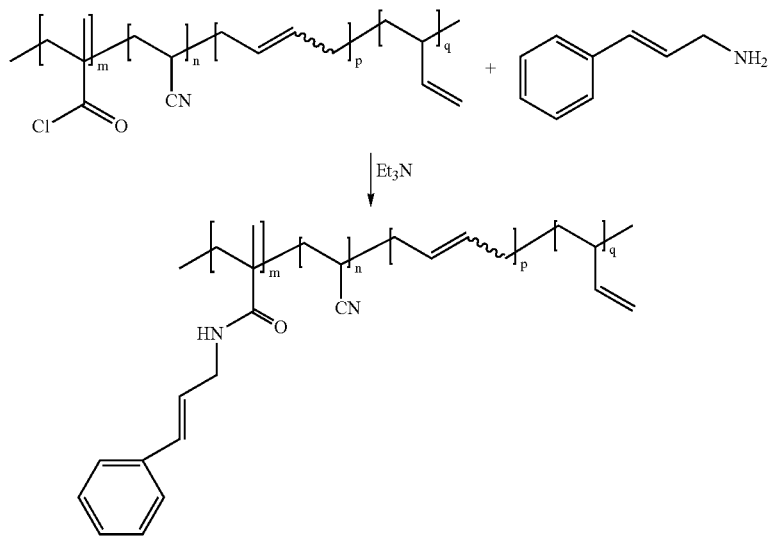

One molar equivalent of cinnamyl amine and one molar equivalent of triethylamine are mixed in dry toluene at 0° C., to which is added the butadiene/acrylonitrile polymer with pendant acid chloride dissolved in dry toluene (one molar equivalent based on the acid chloride). The mixture is allowed to react overnight. The product is purified by precipitation in methanol three times.

Example 6

This example discloses a butadiene/acrylonitrile base polymer with pendant styrenic (electron donor) functionality,

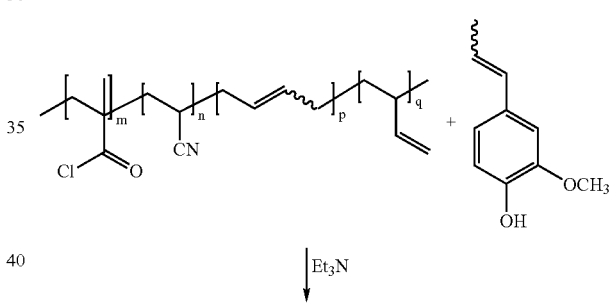

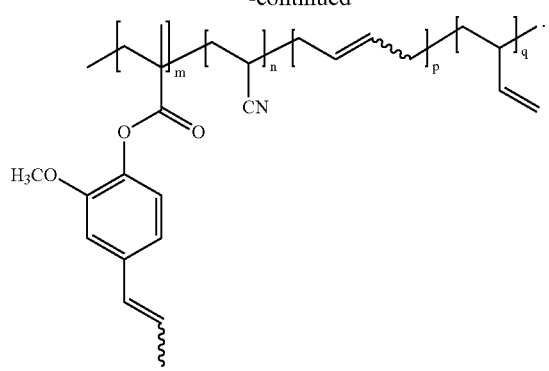

One molar equivalent of isoeugenol and one molar equivalent of triethylamine are mixed in dry toluene at 0° C., to which is added the butadiene/acrylonitrile polymer with pendant acid chloride dissolved in dry toluene (one molar equivalent based on the acid chloride). The mixture is allowed to react overnight. The product is purified by precipitation in methanol three times.

Example 7

This example discloses a butadiene/acrylonitrile base polymer with pendant styrenic (electron donor) functionality,

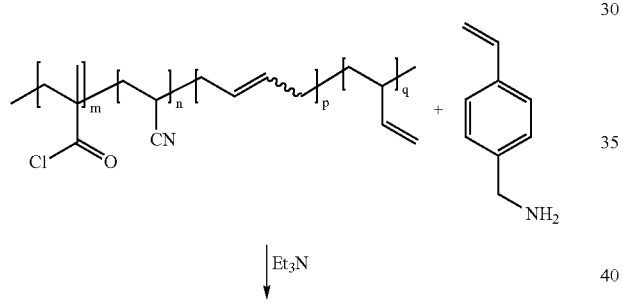

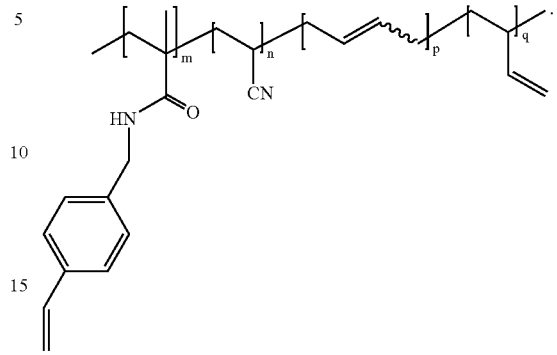

One molar equivalent of 4-vinyl benzyl amine and one molar equivalent of triethylamine are mixed in dry toluene at 0° C., to which is added the butadiene/acrylonitrile polymer with pendant acid chloride dissolved in dry toluene (one molar equivalent based on the acid chloride). The mixture is allowed to react overnight. The product is purified by precipitation in methanol three times.

Example 8

This example discloses a butadiene/acrylonitrile base polymer with pendant vinyl ether (electron donor) functionality,

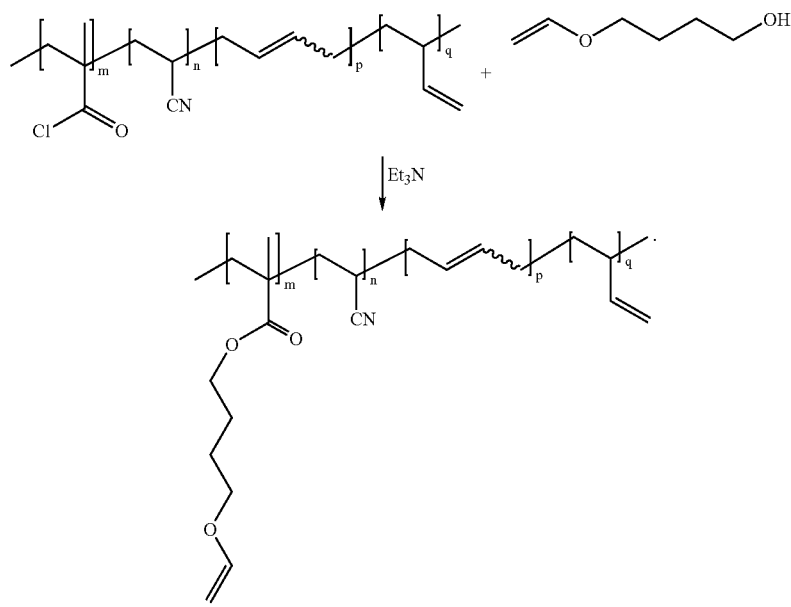

One molar equivalent of 4-hydroxybutyl vinyl ether and one molar equivalent of triethylamine are mixed in dry toluene at 0° C., to which is added the butadiene/acrylonitrile polymer with pendant acid chloride dissolved in dry toluene (one molar equivalent based on the acid chloride). The mixture is allowed to react overnight. The product is purified by precipitation in methanol three times.

Example 9

This example discloses a butadiene/acrylonitrile base polymer with pendant vinyl ether (electron donor) functonality,

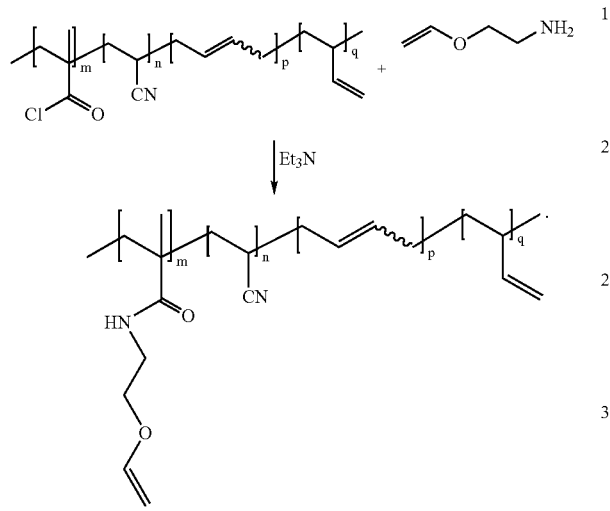

One molar equivalent of 2-aminoethyl vinyl ether and one molar equivalent of triethylamine are mixed in dry toluene at 0° C., to which is added the butadiene/acrylonitrile polymer with pendant acid chloride dissolved in dry toluene (one molar equivalent based on the acid chloride). The mixture is allowed to react overnight. The product is purified by precipitation in methanol three times.

Example 10

This example discloses a hydroxylated styrene/butadiene base polymer with pendant styrenic (electron donor) functionality,

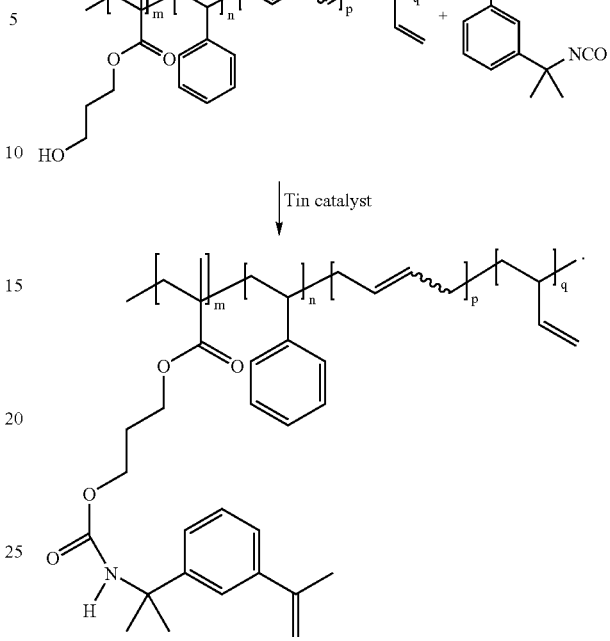

One molar equivalent (based on hydroxyl function) of hydroxylated styrene/butadiene polymer is solvated in dry toluene at 90° C. under nitrogen, followed by the addition of one molar equivalent of 3-isopropenyl-α,α-dimethylbenzyl isocyanate (m-TMI) together with 0.07% of dibutyltin dilaurate (catalyst) based on the total amount of reactants. The resulting mixture is heated for an additional twenty-four hours under nitrogen. After removal of the solvent under reduced pressure, the product is obtained in almost quantitative yield.

Example 11

This example discloses a hydroxylated styrene/butadiene base polymer having pendant styrenic (electron donor) functionality,

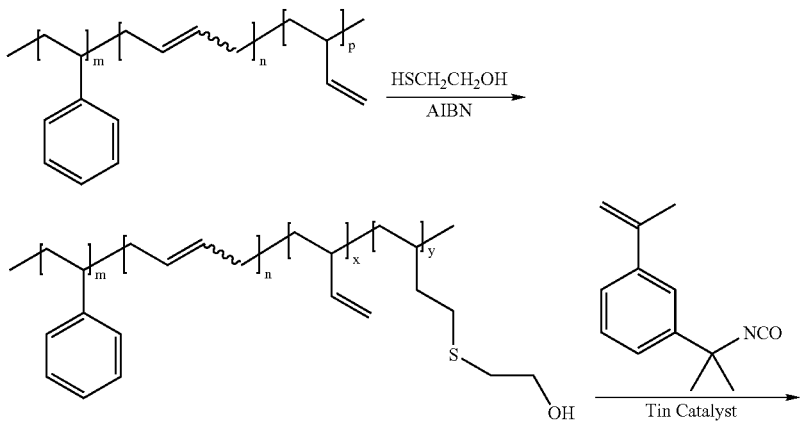

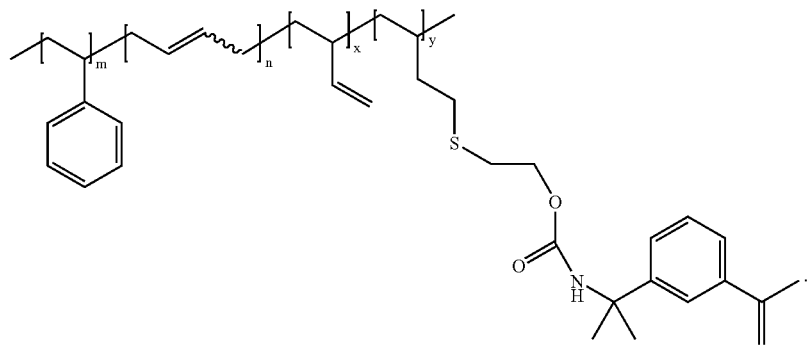

One molar equivalent of butadiene/styrene polymer based on the 1,2- vinyl bonds is solvated in dry toluene under nitrogen and 0.3 molar equivalent of 2-mercaptoethanol is added into the mixture, followed by heating to 75° C. A solution of azodiisobutyronitrile (AIBN) in toluene is then added to the mixture. The mixture is stirred at 75° C. for 7 hours. The product is purified by precipitation in methanol three times.

One molar equivalent (based on hydroxyl function) of hydroxylated styrene/butadiene pdymer prepared as above is solvated in dry toluene at 90° C. under nitrogen, followed by the addition of one molar equivalent of 3-isopropenyl-α,α-dimethylbenzyl isocyanate (m-TMI) together with 0.07% of dibutyltin dilaurate (catalyst) based on the total amount of reactants. The resulting mixture is heated for an additional twenty-four hours under nitrogen. After removal of the solvent under reduced pressure, the product is obtained in almost quantitative yield.

Example 12

This example discloses a hydroxylated styrene/butadiene base polymer having pendant maleimide (electron acceptor) functionality,

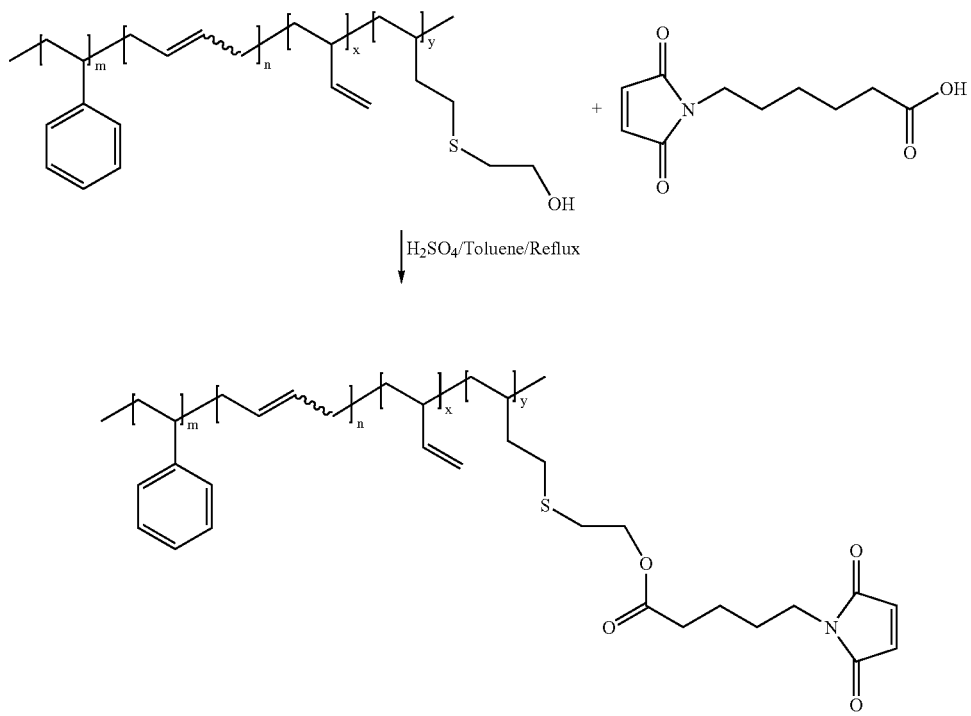

One molar equivalent (based on hydroxyl function) of hydroxylated styrene/butadiene polymer prepared as in Example 11 is solvated in dry toluene at 90° C. under nitrogen, followed by the addition of one molar equivalent of 6-maleimidocaproic acid in toluene. Catalytic amount of sulfuric acid is then introduced into the mixture. The mixture is heated to reflux and water generated during the reaction is removed by azeotrope. The reaction is run overnight. The product is purified by precipitation in methanol three times.

Example 13

This example discloses a polybutadiene base polymer with pendant styrenic (electron donor) functionality,

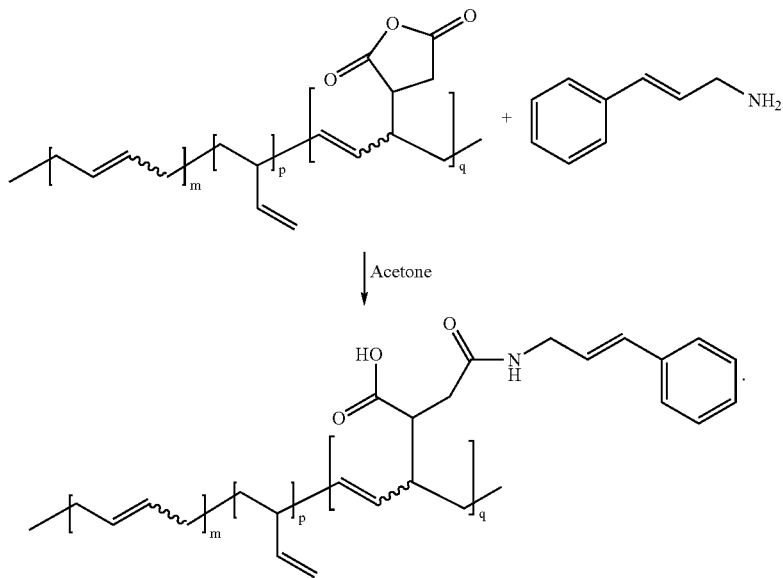

One molar equivalent (based on anhydride function) of polybutadiene adducted with maleic anhydride (trade name: Ricon 131MA20, produced by Sartomer Company) is solvated in acetone, followed by the dropwise addition of one molar equivalent of cinnamyl amine. The reaction mixture is stirred for 6 hours. After acetone is removed by reduced pressure, the polymer is solvated in toluene and the product is purified by precipitation in methanol three times.

Example 14

This example discloses a styrene/acrylic base polymer with pendant acrylate (electron acceptor) functionality.

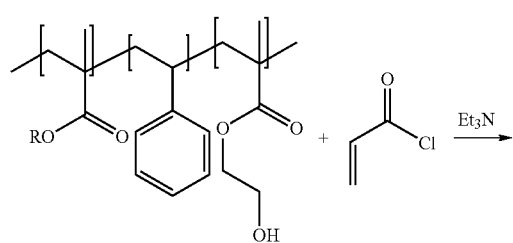

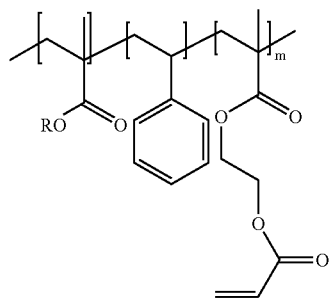

where m=11 based on GPC and NMR analysis (one skilled in the art will recognize that this value may vary slightly due to the polymeric character of the material).

In a 500 mL four-necked flask equipped with a mechanical stirrer, condenser, addition funnel and a $N_2$ inlet, was charged with 45.02 g of a styrene-acrylic polymer (Joncryl 587 from Johnson Polymer) in methylene chloride (100 mL). After the polymer was solvated under nitrogen at room temperature, the solution was cooled to 0° C. and 6.83 g of triethylamine was added to the mixture. To this resulting mixture was added dropwise 6.11 g of acryloyl chloride. The mixture was allowed to react for an additional 6 hours. After washing with aqueous solutions several times until the aqueous phase is neutral, the resulting organic layer was dried over $Mg_2SO_4$ and silica gel. After the solvents were removed under reduced pressure, a white solid was obtained.

Example 15

This example discloses a styrene/acrylic base polymer with pendant styrenic (electron donor) functionality,

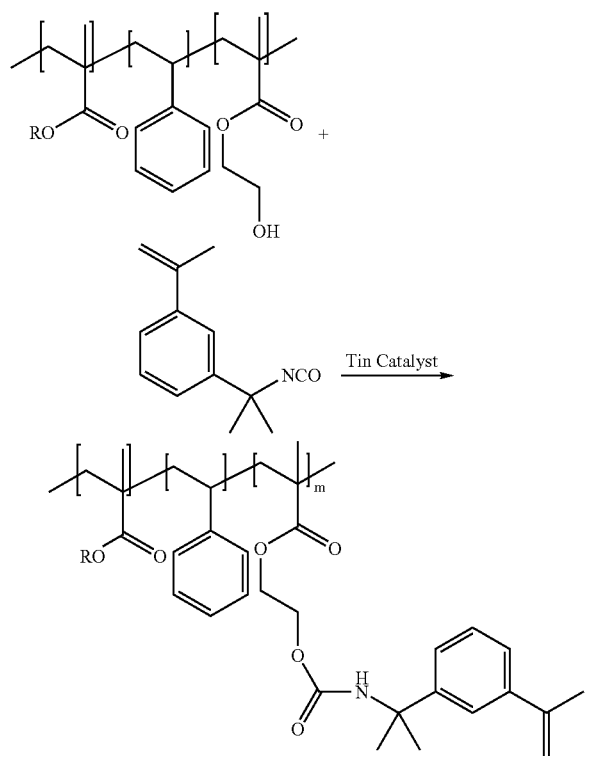

where m=11 based on GPC and NMR analysis (one skilled in the art will recognize that this value may vary slightly due to the polymeric character of the material).

In a 1 L four-necked flask equipped with a mechanical stirrer, condenser, addition funnel and a $N_2$ inlet, was charged with 126.7 g of a styrene acrylic polymer (Joncryl 587 from Johnson Polymer) in methyl ethyl ketone (620 mL). After the polymer was solvated at the refluxing temperature of the solvent under nitrogen, 40.58 g of 3-isopropenyl-α,α-dimethylbenzyl isocyanate (m-TMI) was added to the mixture together with 0.12 g of dibutyltin dilaurate (catalyst). The resulting mixture was heated for an additional twenty-four hours under nitrogen. After removal of the solvent under reduced pressure, a white solid was obtained in almost quantitative yield. According to GPC analysis, the weight average molecular weight and the number average molecular weight of the modified styrene-acrylic polymer are 15,600 g/mol and 8,400 g/mol, respectively. According to DSC analysis, the glass transition temperature of the modified styrene-acrylic polymer is approximately 40° C.

ADHESIVE FILM EXAMPLES

Example 16

An adhesive film was prepared from a polymer system comprising an unsubstituted acrylic/rubber base polymer, an independent electron acceptor resin, an independent electron donor resin, and an epoxy resin, which components and parts by weight used are identified in Table 1. The film formulation also contained a radical initiator, hardeners for the epoxy, a filler and adhesion promoters.

TABLE 1

| Component Chemical Class or Function | Source | Parts by wt. |
|---|---|---|
| Base polymer Acrylic rubber | SG-80DR Nagase ChemteX Corp. | 5 |
| Electron acceptor Bismaleimide | Matrimid 5292A Ciba Specialty Chemicals Corporation | 3 |
| Electron donor Structure I | Adduct of tricyclodecane-dimethanol/m-TMI | 2.5 |
| Epoxy | HP-7200H Dainippon Ink and Chemicals, Inc. | 3.5 |

The electron donor had the following structure:

Structure I

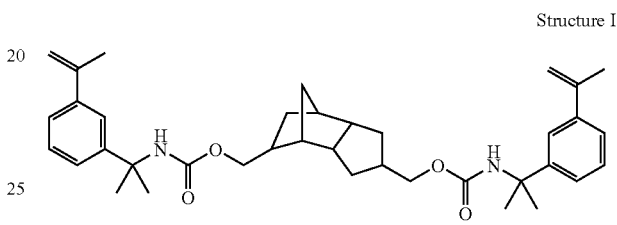

The film formulation was prepared by mixing the components in methyl ethyl ketone with stirring, followed by vacuum degassing. The varnish obtained was coated to a thickness of 2 mil onto a 5 mil thick silicone-treated release-liner and then dried by heating at 100° C. for 10 minutes to form a partially cured adhesive film with a thickness of 1 mil.

Example 17

An adhesive film was prepared from a polymer system comprising a poly(butadiene) base polymer substituted with pendant electron acceptor functionality, an independent electron acceptor resin, an independent electron donor resin, and an epoxy resin, which components and parts by weight used are identified in Table 2. The film formulation also contained a radical initiator, hardeners for the epoxy, and adhesion promoters.

TABLE 2

| Component Chemical Class or Function | Source | Parts by wt. |
|---|---|---|
| Butadiene base polymer substituted with pendant electron acceptor functionality | Polymer from Example 1. | 2 |
| Electron acceptor Bismaleimide | Matrimid 5292A Ciba Specialty Chemicals Corporation | 1 |
| Electron donor Structure I | Adduct of tricyclodecane-dimethanol/m-TMI | 2.5 |
| Epoxy | HP-7200H Dainippon Ink and Chemicals, Inc. | 3.5 |

The film formulation was prepared by mixing the components in methyl ethyl ketone with stirring, followed by vacuum degassing. The varnish obtained was coated to a thickness of 2 mil onto a 5 mil thick silicone-treated release-liner and then dried by heating at 100° C. for 10 minutes to form a partially cured adhesive film with a thickness of 1 mil.

Example 18

An adhesive film was prepared from a polymer system comprising a styrene/acrylic base polymer substituted with pendant electron donor functionality, an independent electron acceptor resin, an independent electron donor resin, and an acrylonitrile/butadiene rubber, which components and parts by weight used are identified in Table 3. The film formulation also contained a radical initiator and adhesion promoters.

TABLE 3

| Component Chemical Class or Function | Source | Parts by wt. |
|---|---|---|
| Sytrene/acrylic base polymer substituted with pendant electron donor functionality | Polymer from Example 15 | 2 |
| Electron acceptor Bismaleimide | Matrimid 5292A Ciba Specialty Chemicals Corporation | 5 |
| Electron donor Structure I | Adduct of tricyclodecane-dimethanol/m-TMI | 1.75 |
| Acrylonitrile/butadiene rubber | Zeon Chemicals | 4 |

The film formulation was prepared by mixing the components in methyl ethyl ketone with stirring, followed by vacuum degassing. The varnish obtained was coated to a thickness of 2 mil onto a 5 mil thick silicone-treated release-liner and then dried by heating at 100° C. for 10 minutes to form a partially cured adhesive film with a thickness of 1 mil.

Example 19

An adhesive film was prepared from a polymer system comprising a styrene/acrylic base polymer substituted with pendant electron donor functionality, an acrylonitrile/butadiene base polymer substituted with pendant electron donor functionality, an independent electron acceptor resin, an independent electron donor resin, which components and parts by weight used are identified in Table 4. The film formulation also contained a radical initiator, filler, and adhesion promoters.

TABLE 4

| Component Chemical Class or Function | Source | Parts by wt. |
|---|---|---|
| Sytrene/acrylic base polymer substituted with pendant electron donor functionality | Polymer from Example 15 | 2 |
| Acrylonitrile/butadiene base polymer substituted with pendant electron donor functionality | Polymer from Example 2 | 4 |
| Electron acceptor Bismaleimide | Matrimid 5292A Ciba Specialty Chemicals Corporation | 5 |
| Electron donor Structure I | Adduct of tricyclodecane-dimethanol/m-TMI | 1.8 |

The film formulation was prepared by mixing the components in methyl ethyl ketone with stirring, followed by vacuum degassing. The varnish obtained was coated to a thickness of 2 mil onto a 5 mil thick silicone-treated release-liner and then dried by heating at 100° C. for 10 minutes to form a partially cured adhesive film with a thickness of 1 mil.

Example 20

An adhesive film was prepared from a polymer system comprising a acrylonitrile/butadiene base polymer substituted with pendant electron donor functionality, an independent electron acceptor resin, an independent electron donor resin, and an epoxy, which components and parts by weight used are identified in Table 5. The film formulation also contained a radical initiator, hardeners for the epoxy, filler, and adhesion promoters.

TABLE 5

| Component Chemical Class or Function | Source | Parts by wt. |
|---|---|---|
| Acrylonitrile/butadiene base polymer substituted with pendant electron donor functionality | Polymer from Example 2 | 2.5 |
| Electron acceptor Bismaleimide | Matrimid 5292A Ciba Specialty Chemicals Corporation | 3 |
| Electron donor Structure I | Adduct of tricyclodecane-dimethanol/m-TMI | 2.5 |
| Epoxy | HP-7200H Dainippon Ink and Chemicals, Inc. | 3.5 |

The film formulation was prepared by mixing the components in methyl ethyl ketone with stirring, followed by vacuum degassing. The varnish obtained was coated to a thickness of 2 mil onto a 5 mil thick silicone-treated release-liner and then dried by heating at 100° C. for 10 minutes to form a partially cured adhesive film with a thickness of 1 mil.

Example 21

An adhesive film was prepared from a polymer system comprising a acrylonitrile/butadiene base polymer substituted with pendant electron donor functionality, an independent electron acceptor resin, an independent electron donor resin, and an epoxy, which components and parts by weight used are identified in Table 6. The film formulation also contained a radical initiator, hardeners for the epoxy, filler, and adhesion promoters.

TABLE 6

| Component Chemical Class or Function | Source | Parts by wt. |
|---|---|---|
| Acrylonitrile/butadiene base polymer substituted with pendant electron donor functionality | Polymer from Example 3 | 2.5 |
| Electron acceptor Bismaleimide | Matrimid 5292A Ciba Specialty Chemicals Corporation | 3 |
| Electron donor Structure I | Adduct of tricyclodecane-dimethanol/m-TMI | 2.5 |
| Epoxy | HP-7200H Dainippon Ink and Chemicals, Inc. | 3.5 |

The film formulation was prepared by mixing the components in methyl ethyl ketone with stirring, followed by vacuum degassing. The varnish obtained was coated to a thickness of 2 mil onto a 5 mil thick silicone-treated release-liner and then dried by heating at 100° C. for 10 minutes to form a partially cured adhesive film with a thickness of 1 mil.

Example 22

An adhesive film was prepared from a polymer system comprising an acrylonitrile/butadiene base polymer substituted with pendant electron acceptor functionality, a styrene/acrylic base polymer substituted with pendant electron donor functionality, an independent electron acceptor resin, an independent electron donor resin, which components and parts by weight used are identified in Table 7. The film formulation also contained a radical initiator.

TABLE 7

| Component Chemical Class or Function | Source | Parts by wt. |
|---|---|---|
| Acrylonitrile/butadiene base polymer substituted with pendant electron donor functionality | Polymer from Example 1 | 2.5 |
| Styrene/acrylic base polymer substituted with pendant electron donor functionality | Polymer from Example 15 | 3 |
| Electron acceptor Bismaleimide | Matrimid 5292A Ciba Specialty Chemicals Corporation | 5 |
| Electron donor Structure I | Adduct of tricyclodecane-dimethanol/m-TMI | 1.8 |

The film formulation was prepared by mixing the components in methyl ethyl ketone with stirring, followed by vacuum degassing. The varnish obtained was coated to a thickness of 2 mil onto a 5 mil thick silicone-treated release-liner and then dried by heating at 100° C. for 10 minutes to form a partially cured adhesive film with a thickness of 1 mil.

COMPARATIVE ADHESIVE FILM EXAMPLE

Example 23

This example discloses an adhesive film prepared with a polymeric system containing an acrylonitrile/butadiene base polymer, and epoxy resin, and no electron donor nor electron acceptor functionality. The formulation also contained a phenol novolak resin and curing agents. The formulation components and parts by weight are disclosed in Table 8.

TABLE 8

| Component Chemical Class or Function | Source | Parts by wt. |
|---|---|---|
| Acrylonitrile/butadiene rubber | Nipol 1072 Zeon Chemicals | 2.7 |
| Epoxy | HP-7200H Dainippon Ink and Chemicals, Inc. | 3.5 |
| Phenol Novolak resin | HRJ-1166 Schenectady International Inc. | 1 |

The film formulation was prepared by mixing the components in methyl ethyl ketone with stirring, followed by vacuum degassing. The varnish obtained was coated to a thickness of 2 mil onto a 5 mil thick silicone-treated release-liner and then dried by heating at 100° C. for 10 minutes to form a partially cured adhesive film with a thickness of 1 mil.

PERFORMANCE EXAMPLES

Example 24

A sample of each film produced in Examples 16-22 and Comparative Example 23 was used to bond a 100 by 100 square mil silicon die to a PI flex substrate at 120° C. in 5 seconds and cured at 180° C. for one minute. The die shear strength of these bare packages was measured at 180° C. on a Dage Series 4000 Bondtester.

The results are disclosed in Table 9 and demonstrate that the inventive films have superior adhesive strength.

TABLE 9

| DIE SHEAR STRENGTH in Kg Force @ 180° C. | |
|---|---|
| Cure condition | 180° C./1 min |
| Die shear strength measure temperature | 180° C. |
| Example 16 | 1.86 |
| Example 17 | 0.90 |
| Example 18 | 2.22 |
| Example 19 | 1.93 |
| Example 20 | 2.78 |
| Example 21 | 2.80 |
| Example 22 | 3.00 |
| Comparative Example 23 | 0.26 |

In a particular embodiment, the film forming polymers will be based on rubbery polymers having a weight average molecular weight (Mw) within the range of 300,000 to 1,500,000, and will be prepared from acrylic, vinyl, or conjugated diene monomers. These polymers will be the base for an electron donor/electron acceptor adhesive system, by which it is meant that some of the compounds in the system will be electron donors and some will be electron acceptors. In general, electron donor refers to an olefin compound that contains a carbon to carbon double bond with an electron-donating group, for example, vinyl ethers and compounds containing a carbon to carbon double bond attached to an aromatic ring and conjugated with the unsaturation in the ring; electron acceptor refers to an olefin compound that contains a carbon to carbon double bond with an electron-withdrawing group, for example, fumarates, maleates, acrylates, and maleimides. Specific compounds are disclosed earlier in this specification.

The base rubbery polymer will be chosen from polymers containing no electron donor or acceptor functionality; polymers substituted with pendant electron donor functionality; polymers substituted with pendant electron acceptor functionality; polymers substituted with both electron donor and electron acceptor functionality; and a combination of polymers, one or more substituted with electron donor functionality and one or more substituted with electron acceptor functionality. In the case in which the rubbery polymers have no electron donor or acceptor functionality, the adhesive system will contain independent compounds having electron donor functionality and electron acceptor functionality. In the case in which the rubbery polymers have either electron donor or electron acceptor functionality, the adhesive system will contain independent compounds having electron acceptor functionality or electron donor functionality, respectively, in order to form a complete electron donor/electron acceptor system. It is optional to add additional electron donor or electron acceptor functionality to the adhesive systems.

The prepared films of this invention are suitably used for attaching semiconductor chips to substrates and for this purpose can be cured within two minutes at a temperature or temperature range below 300° C.

As would be understood by those skilled in the art, when the electron donor and electron acceptor functionality is added as independent compounds or polymers, those materials preferably should be compatible with the rubbery polymer. Compatible in this sense means that the compounds are capable of forming a homogenous intimate mixture without separation from the rubbery polymer into two or more phases during film preparation and after curing.

Example 25

Seven film adhesives, identified as Examples 25 A through G, were prepared from various rubbery polymers and independent electron donor and electron acceptor compounds. The electron donor compound used had two end styrenic functionalities and a dicyclopentadiene backbone. The electron acceptor compound used was a bismaleimide sold under the tradename Anilix-MI. The rubbery polymers used in the adhesive formulation are indicated in Table 10 as polymers H through N and were the following:

H: nitrile-butadiene rubber (Nipol 1072J, Zeon);
I: proprietary carboxyl terminated nitrile butadiene and epoxy adduct;
J: proprietary carboxyl terminated nitrile butadiene and epoxy adduct;
K: proprietary carboxyl terminated nitrile butadiene and epoxy adduct;
L: acrylic rubber (Nagase, SG-8H DR)
M: acrylic rubber (Nagase, SG-P3 DR)
N: vinyl terminated nitrile butadiene (Hycar1300×43, Noveon)

The compositions, including the weight average molecular weight and glass transition temperature (Tg) of the rubbery polymers are recorded in Table 10. The components of the film adhesives were blended with methyl ethyl ketone (solvent) and coated onto a release liner to a thickness of approximately 25 μm. The solvent was evaporated off at a temperature of 99° C. for three minutes, and then the adhesive on release liner was passed through a roll laminator. Examples 25A, B, C, D, and G were rolled at 93° C.; Examples 25E and F were rolled at 140° C. Each adhesive (on release liner) was applied to a substrate with the adhesive contacting the substrate. The release liner was removed and a silicon chip contacted with the adhesive with temperature and pressure; Examples 25A, B, C, D, and G were contacted at 120° C. and 2 kg pressure; Examples 25E and F were contacted at 170° C. and 2 kg pressure. Die shear strength (DSS) was tested at 245° C. after 180° C. and one minute cure. Commercially acceptable die shear strengths preferably are greater than 3.0. The Examples show that high molecular weight rubbery polymers are needed in order to obtain acceptable die shear strengths.

TABLE 10

Composition in Parts by Weight and Die Shear Strength of Film Adhesives Containing Rubbery Polymers

| Polymer | Mw in 000 | Tg ° C. | Ex 25A | Ex 25B | Ex 25C | Ex 25D | Ex 25E | Ex 25F | Ex 25G |
|---|---|---|---|---|---|---|---|---|---|
| H | 320 | −22 | 7.00 | | | | | | |
| I | 85 | −9 | | 7.00 | | | | | |
| J | 32 | −15 | | | 7.00 | | | | |
| K | 15 | 40 | | | | 7.00 | | | |
| L | 350 | 0 | | | | | 7.00 | | |
| M | 1000 | 0 | | | | | | 7.00 | |
| N | 13 | −45 | | | | | | | 7.00 |
| Electron Donor | | | 3.00 | 3.00 | 3.00 | 3.00 | 3.00 | 3.00 | 3.00 |
| Electron Acceptor | | | 5.00 | 5.00 | 5.00 | 5.00 | 5.00 | 5.00 | 5.00 |
| Peroxide | | | 0.60 | 0.60 | 0.60 | 0.60 | 0.60 | 0.60 | 0.60 |
| Total solids ppw | | | 15.60 | 15.60 | 15.60 | 15.60 | 15.60 | 15.60 | 15.60 |
| DSS | | | 3.3 | 2.2 | 1.5 | 0.9 | 4.9 | 3.5 | 1.6 |

The invention claimed is:

1. A rubbery film adhesive prepared from materials consisting essentially of:
   a rubbery polymer prepared from acrylic, vinyl, or conjugated diene monomers, substituted with both pendant electron donor and pendant electron acceptor functionality, and having a weight average molecular weight in the range of 300,000 to 1,500,000, and
   a free radical initiator;
characterized in that the film adhesive can be cured within two minutes at a temperature below 300° C.

2. The film adhesive according to claim 1 in which the rubbery polymers are acrylics, styrene-acrylic copolymers, or acrylonitrile-butadiene copolymers, or combinations of those.

3. The film adhesive according to claim 1 further comprising a vinyl ether selected from the group consisting of bis[4-(vinyloxy)-butyl]terephthalate, bis[4-(vinyloxy)butyl] (4-methyl-1,3-phenylene)-biscarbamate, bis[4-(vinyloxy) butyl]1,6-hexanediylbiscarbamate, 4-(vinyloxy)-butyl stearate, and bis[4-(vinyloxy) butyl)](methylenedi-4,1-phenylene)-biscarbamate.

* * * * *